United States Patent [19]

Sciscione

[11] 4,281,213
[45] Jul. 28, 1981

[54] INSULATING SUPPORT STRUCTURE FOR AN ELECTRIC BUS CONDUCTOR

[75] Inventor: Philip Sciscione, Philadelphia, Pa.
[73] Assignee: General Electric Company, Philadelphia, Pa.
[21] Appl. No.: 131,740
[22] Filed: Mar. 20, 1980
[51] Int. Cl.³ .................... H02G 5/02; H01B 17/18
[52] U.S. Cl. ........................ 174/68 B; 24/135 R; 24/243 B; 174/99 E; 174/169; 248/74 R
[58] Field of Search ............... 174/68 B, 99 B, 99 E, 174/168, 169, 171; 24/132 R, 132 WL, 135 R, 135 N, 243 R, 243 B, 248 SA, 249 R, 249 LS; 248/62, 74 R, 316 B, 316 C; 339/265 R, 265 F; 403/344

[56] References Cited

U.S. PATENT DOCUMENTS

| | | | |
|---|---|---|---|
| 2,069,163 | 1/1937 | Hibner, Jr. | 248/74 R |
| 2,706,744 | 4/1955 | Rudd | 174/99 E X |
| 4,215,237 | 7/1980 | Burtnett | 174/99 B |

FOREIGN PATENT DOCUMENTS 936323  2/1948  France ................... 24/243 R

Primary Examiner—Laramie E. Askin
Attorney, Agent, or Firm—William Freedman

[57] ABSTRACT

A bus conductor with a cylindrical external surface is supported on an insulator by first and second bus-supporting members, each comprising spaced legs and flanges at the free ends of the legs. The bus-supporting members embrace the bus conductor when the flanges are in juxtaposition. One set of flanges is fastened together by fastening means comprising a screw extending between the flanges and threaded into one of the flanges and a nut positioned between the flanges and threaded onto the screw. The nut is axially movable on the screw between first and second positions. When in the first position, the nut is tightened on the screw against the juxtaposed flange of one of the bus-supporting members, thereby locking the flanges in a fixed-joint position. When in the second position, the nut is tightened on the screw against the juxtaposed flange of the other bus-supporting member, thereby locking the flanges in a slip-joint position. The bus conductor can slide with respect to the supporting members when the flanges are in said slip-joint position.

6 Claims, 4 Drawing Figures

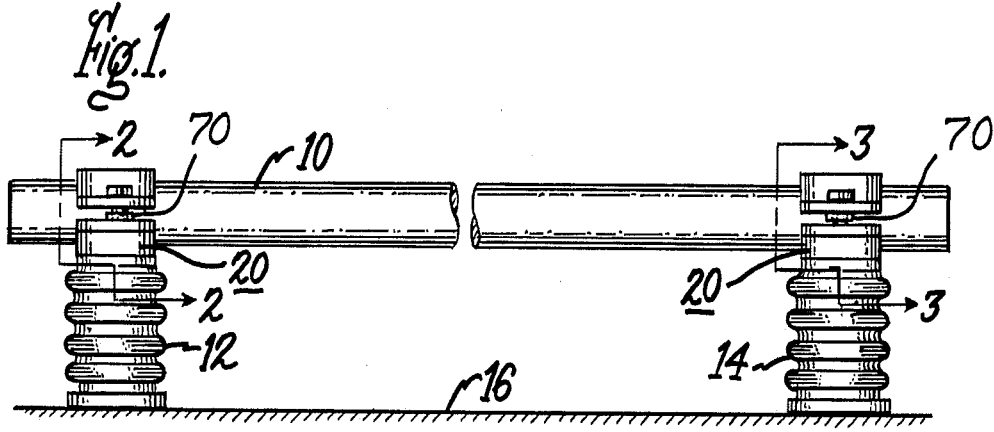
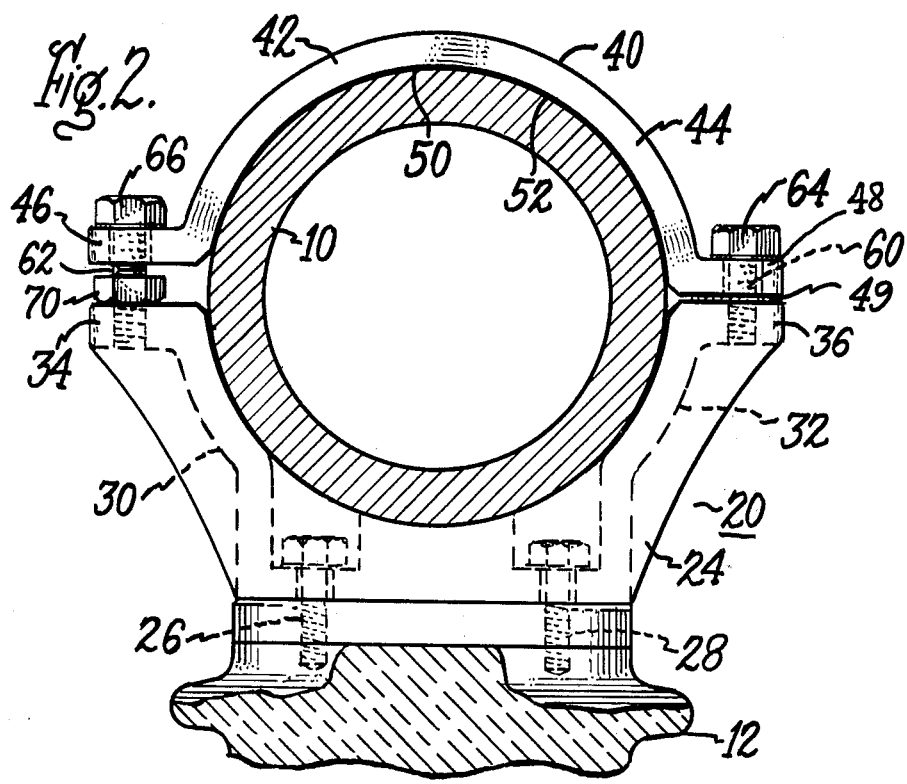

INSULATING SUPPORT STRUCTURE FOR AN ELECTRIC BUS CONDUCTOR

BACKGROUND

This invention relates to electric bus equipment and, more particularly, relates to bus equipment comprising an insulator, a bus conductor, and means mounting the bus conductor on the insulator.

In electric bus equipment of this type, the bus conductor is typically supported at a plurality of locations along its length. At each of these locations, there is an insulator on which the bus conductor is supported. Typically, the bus conductor is fixed to one of these supporting insulators but is allowed to move longitudinally at the other supporting insulator or insulators so as to permit thermal expansion and contraction of the bus conductor without damaging the insulators.

SUMMARY

An object of my invention is to provide a simple and rugged support for mounting a bus conductor on an insulator, which support can be readily adapted to provide either a fixed joint which permits no relative motion between the conductor and the insulator or a slip joint which permits longitudinal motion of the conductor relative to the insulator.

Another object is to provide a support of this type which is strong enough effectively to restrain transverse motion of the bus on its insulator in response to the high magnetic forces which are developed by short circuit currents.

Still another object is to provide bus supports which are able to fulfill the above objects and yet which require no holes or other discontinuities in the bus conductor. Providing such holes or discontinuities can be expensive and time consuming, particularly since they usually need to be precisely located.

In carrying out the invention in one form, I provide a first and second bus-conductor supporting members, each of a generally U-shape and comprising spaced legs and a flange at the free end of one leg. The supporting members have surfaces which together define a generally cylindrical internal surface when the flanges of the two supporting members are placed in juxtaposition. A bus conductor has a generally cylindrical external surface surrounded by said cylindrical internal surface. For fastening together the juxtaposed flanges, there is provided fastening means that is adjustable to position the flange of the second supporting member in either of two fixed positions relative to the juxtaposed flange of the first supporting member. One of these positions is a slip-joint position spaced by a relatively large distance from the juxtaposed flange of the first member, thereby providing sufficient clearance between said internal and external surfaces to permit the bus conductor to slide longitudinally relative to the supporting members. The other position is a fixed joint position sufficiently close to the juxtaposed flange of the first member that said internal cylindrical surface tightly embraces the external cylindrical surface of the bus conductor.

The fastening means comprises a threaded member extending between the juxtaposed flanges and threaded into one of the flanges and nut structure positioned between the flanges and threaded onto said threaded member. A part on the threaded member bears against a surface of one of the flanges so as to force said one flange toward the other when said part is rotated in a tightening direction. The nut structure is axially movable on the threaded member between first and second positions. When in said first position, the nut structure is tightened on the threaded member against the juxtaposed flange of the first member, thereby locking the flanges in said fixed-joint position. When in said second position, the nut structure is tightened against the juxtaposed flange of the second member, thereby locking the flanges in said slip-joint position.

BRIEF DESCRIPTION OF DRAWINGS

For a better understanding of the invention, reference may be had to the following description taken in connection with the accompanying drawing, wherein:

FIG. 1 is a partially-schematic side elevational view of bus equipment embodying one form of my invention.

FIG. 2 is an enlarged sectional view along the line 2—2 of FIG. 1.

DETAILED DESCRIPTION OF PREFERRED EMBODIMENT

Figure 3:
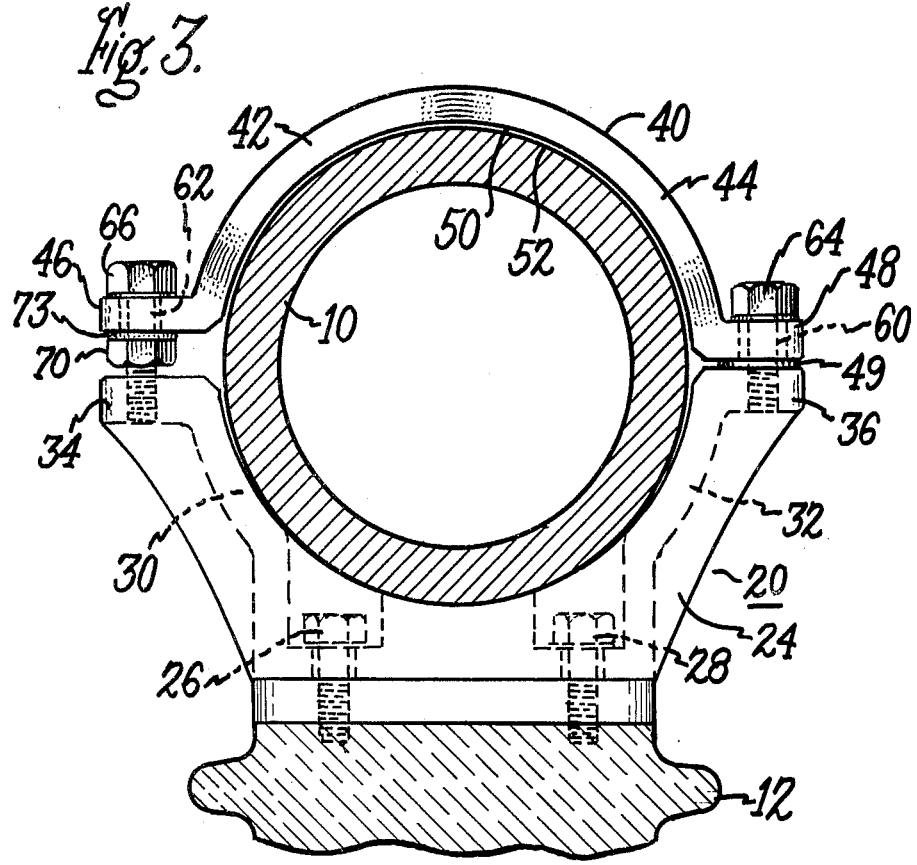
FIG. 3 is an enlarged sectional view along the line 3—3 of FIG. 1.

Referring first to FIG. 1, there is shown a bus conductor 10 which is supported at spaced-apart locations along its length by two post-type insulators 12 and 14. Each of these insulators is secured at its lower, or proximate, end to fixed structure 16. At its upper, or distal, end, each insulator is provided with bus-conductor supporting means 20. The supporting means 20 at the location of insulator 12 provides a fixed joint between the bus conductor and the insulator which permits no relative motion between the bus conductor and the insulator. The supporting means 20 at the location of insulator 14 provides a slip joint between the bus conductor and the insulator 14, which permits longitudinal motion of the bus conductor along its longitudinal axis, thus protecting the insulators from being damaged by thermally-induced expansion or contraction of the bus conductor along its length.

Referring next to FIG. 2, the fixed joint, as viewed from the section line 2—2 of FIG. 1, is depicted in greater detail. The support means 20 of FIG. 2 comprises a first member 24 of generally U-shaped cross-section which is secured to the top of insulator 12 by a plurality of screws 26 and 28 extending through the member 24 and threaded into suitable hardware on top of insulator 12. The U-shaped member 24 comprises a pair of spaced-apart legs 30 and 32 and integral flanges 34 and 36 at the upper ends of the legs extending generally radially outward from the legs.

Atop the first support member 24 is a second U-shaped support member 40 which comprises spaced-apart legs 42 and 44 and integral flanges 46 and 48 at the ends of the legs extending radially outward from the legs. The support members 24 and 40 have generally semi-cylindrical surfaces which together define a generally cylindrical internal surface 50 when the flanges of the two support members are placed in juxtaposition as shown in FIG. 2. The bus conductor has a generally cylindrical external surface 52, and this surface is substantially surrounded by the cylindrical internal surface 50 of the support means 24, 40.

The juxtaposed flanges of the support members are fastened together by headed screws which extend between the juxtaposed flanges. Referring to the right-hand flanges, screw 60 is threaded into a tapped hole in lower flange 36 and, when tightened, it acts through its head 64 to force flange 48 toward flange 36. A thin metal spacer 49 between the flanges controls the final spacing of the flanges 36 and 48.

Referring to the left-hand flanges, screw 62 extends between juxtaposed flanges 34 and 46, is threaded into a hole in flange 34, and when tightened acts through its head 66 to force upper flange 46 toward lower flange 34. Between the two juxtaposed flanges 34 and 46 and threaded on the screw 62 is a jam nut 70. During assembly, this jam nut is maintained slightly spaced from the lower flange 34 while the screw is being threaded into the lower flange. The assembler tightens screw 62 to an appropriately high torque, thereby causing the internal surface 50 on the support members 24, 40 to tightly embrace the external surface 52 of the bus conductor. After this has been done, he rotates the jam nut 70 on the screw 62, tightening the nut against the flange 34, thereby locking the screw in its position of adjustment with respect to the two flanges 34 and 46. This completes the fixed joint.

FIG. 3 shows the slip joint as viewed along the line 3—3 of FIG. 1. It will be seen that this slip joint utilizes parts of the same design as the fixed joint. Corresponding parts of the two joints have been assigned the same reference numerals.

The slip joint of FIG. 3 is formed in a similar manner to that of FIG. 2. That is, the right-hand flanges 36 and 48 are first fastened together by screw 60, and then the left hand screw 62 is inserted and tightened to draw left hand flanges 46 and 34 together. But this tightening action is continued only until a predetermined minimum clearance space is developed between the cylindrical surfaces 52 and 50 of the bus conductor and the support. When this clearance space is about 1/32 inch, the tightening of screw 62 is discontinued. The jam nut 70, which had been spaced from the two flanges 46 and 34, is then threaded in an upward direction on the screw 62 until it presses against the upper flange 46. Preferably, a conventional lock washer 73 is located atop the jam nut 70 and is compressed by upward motion of the jam nut. The jam nut is tightened to a predetermined torque to lock the screw 62 to the upper flange 46. Thus, the parts of the support are all locked in their position of FIG. 3, with the desired clearance between the external surface 52 of the bus conductor 10 and the internal surface 50 of the support. This clearance, of course, permits the bus conductor to slide longitudinally with respect to the support in response to thermal expansion and contraction of the bus conductor.

It will be seen that the fixed joint of FIG. 2 and the slip joint of FIG. 3 comprise identical parts. This is economically advantageous in that it reduces the number of different parts which must be made and carried in inventory by the manufacturer.

Another advantage of my joints is that they require no holes or other discontinuities in the bus conductor. Not only does it require time and effort to make such holes or discontinuities, but they usually must be precisely located to line up with their mating support structure. My supporting arrangement eliminates the expenses required not only to make such holes or discontinuities but also the expenses, effort, and time needed to precisely locate such holes or discontinuities.

My support structure is exceptionally rugged and able to effectively withstand forces imposed transversely of the bus conductor because it substantially completely embraces the bus conductor. The fact that the upper support member (40) is joined to the lower one at the ends of both of its legs (42 and 44) further contributes to the mechanical strength of the support.

It is to be noted that the jam nut 70, being located between the flanges 34 and 46, is in a position of low electrical stress. Its presence therefore results in no projections that could produce electric field concentrations and resulting corona from the high voltage parts connected to the bus conductor.

Figure 4:
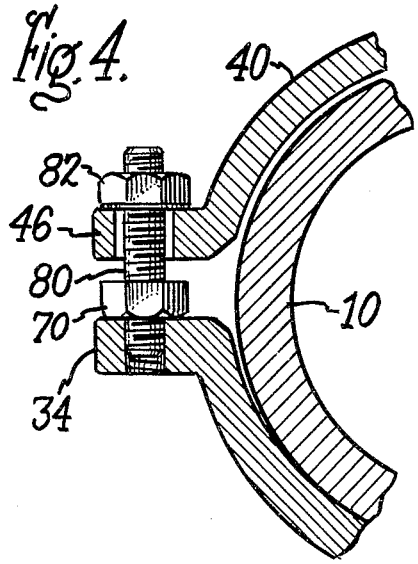
FIG. 4 is an enlarged sectional view corresponding to FIG. 2 except showing a modified form of the invention.

Although the preferred form of my invention, which is shown in FIGS. 1—3, uses a screw 62 as the primary fastening means between the flanges 46 and 34, my invention in its broader aspects comprehends the use of a stud instead of the screw. For example, referring to FIG. 4, there is shown a stud 80 which is threaded into a tapped hole in the flange 34. This stud passes freely through a hole in the upper flange 46 and has a nut 82 threaded on its upper end. Before the assembly operation, the stud is threaded into the tapped hole in the lower flange and the jam nut 70 is threaded onto the stud and located in its position of FIG. 4. When the upper support member 40 is suitably positioned, as shown in FIG. 4, the nut 82 is applied and threaded onto the stud and tightened to a suitable torque to clamp the upper support member against the bus conductor, thereby forming a fixed joint.

If a slip joint is desired, the nut 82 is tightened only enough to provide the desired clearance between the upper support 40 and the bus conductor 10. Then the jam nut 70 is threaded in an upward direction on the stud until it presses against the upper flange 46, following which the jam nut is tightened to a predetermined torque to lock the stud to the upper flange 46. Preferably, a lock washer (not shown in FIG. 4 but corresponding to 73 of FIG. 3) is positioned between the jam nut 70 and the upper flange 46 when this slip joint is being provided.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In electric bus equipment:
   (a) a post-type insulator having spaced-apart proximate and distal ends,
   (b) a first bus-conductor supporting member of generally U-shaped form fixed to the distal end of said insulator and comprising a pair of spaced-apart legs and flanges at the free ends of said legs projecting generally radially-outwardly from said legs,
   (c) a second bus-conductor supporting member of generally U-shaped form comprising spaced legs and flanges at the free ends of said legs projecting generally radially-outwardly from said legs,
   (d) said supporting members having generally semi-cylindrical surfaces which together define a generally cylindrical internal surface when the flanges of said second U-shaped member are placed in juxtaposition to the flanges of said first U-shaped member, (e) a bus conductor having a generally cylindrical external surface substantially surrounded by said generally cylindrical internal surface,
(f) means for fastening the flanges of said second support member to the juxtaposed flanges of the first support member,
(g) the fastening means between one set of juxtaposed flanges being adjustable to position the associated flange of said second supporting member in either of two fixed positions relative to the juxtaposed flange of said first member, one of said positions being a slip-joint position spaced by a relatively large distance from the juxtaposed flange of said first member thereby providing sufficient clearance between said internal and external cylindrical surfaces to permit said bus conductor to slide longitudinally relative to said supporting members, the other of said positions being a fixed-joint position sufficiently close to the juxtaposed flange of said first member that said internal cylindrical surface tightly embraces said external cylindrical surface,
(h) said fastening means of (g) comprising a threaded member extending between said one set of juxtaposed flanges and threaded into one of the flanges of said one set and nut structure positioned between said flanges and threaded onto said threaded member,
(i) said threaded member having thereon a part bearing against a surface of one of said flanges of said one set so as to force said one flange toward the other flange of said one set when said part is rotated in a tightening direction,
(j) said nut structure being axially movable on said threaded member between first and second positions, the nut structure when in said first position being tightened on said threaded member against the juxtaposed flange of said first member thereby locking said one set of flanges in said fixed-joint position, and the nut structure when in said second position being tightened against the juxtaposed flange of said second member thereby locking said one set of flanges in said slip-joint position.

2. The combination of claim 1 in which said threaded member is a stud and said part thereon is a nut rotatable on said stud.

3. The combination of claim 1 in which said threaded member and said part thereon are integrally connected to constitute a headed screw, with said part forming the head of the screw.

4. In electric bus equipment:
(a) a post-type insulator having spaced-apart proximate and distal ends,
(b) a first bus-conductor supporting member of generally U-shaped form fixed to the distal end of said insulator and comprising a pair of spaced-apart legs and a flange at the free end of one of said legs projecting generally radially-outwardly from said one leg,
(c) a second bus-conductor supporting member of generally U-shaped form comprising spaced legs and a flange at the free end of one of said legs projecting generally radially-outwardly from said one leg,
(d) said supporting members having generally semi-cylindrical surfaces which together define a generally cylindrical internal surface when said flanges are placed in juxtaposition,
(e) a bus conductor having a generally cylindrical external surface substantially surrounded by said generally cylindrical internal surface,
(f) means for securing together said supporting members comprising means fastening the flange of said second support member to the juxtaposed flange of the first support member,
(g) the fastening means between said juxtaposed flanges being adjustable to position the flange of said second supporting member in either of two fixed positions relative to the juxtaposed flange of said first supporting member, one of said positions being a slip-joint position spaced by a relatively large distance from the juxtaposed flange of said first member thereby providing sufficient clearance between said internal and external cylindrical surfaces to permit said bus conductor to slide longitudinally relative to said supporting members, the other of said positions being a fixed-joint position sufficiently close to the juxtaposed flange of said first member that said internal cylindrical surface tightly embraces said external cylindrical surface,
(h) said fastening means of (g) comprising a threaded member extending between said juxtaposed flanges and threaded into one of the flanges and nut structure positioned between said flanges and threaded onto said threaded member,
(i) said threaded member having thereon a part bearing against a surface of one of said flanges so as to force said flanges together when said part is rotated in a tightening direction,
(j) said nut structure being axially movable on said threaded member between first and second positions, the nut structure when in said first position being tightened on said threaded member against one of said juxtaposed flanges thereby locking said flanges in said fixed-joint position, and the nut structure when in said second position being tightened against the other of said juxtaposed flanges thereby locking said flanges in said slip-joint position.

5. The combination of claim 4 in which said threaded member is a stud and said part thereon is a nut rotatable on said stud.

6. The combination of claim 4 in which said threaded member and said part thereon are integrally connected to constitute a headed screw, with said part forming the head of the screw.

* * * * *